US010026045B1

(12) United States Patent
Portnoy et al.

(10) Patent No.: US 10,026,045 B1
(45) Date of Patent: Jul. 17, 2018

(54) COMPUTER SYSTEM OR PROCESS PERFORMANCE METHOD AND SYSTEM

(75) Inventors: Gregory Portnoy, Kensington, MD (US); Richard Wiseman, Kensington, MD (US)

(73) Assignee: INFORMATION SCIENCES CORPORATION, Kensington, MD (US)

( * ) Notice: Subject to any disclaimer, the term of this patent is extended or adjusted under 35 U.S.C. 154(b) by 581 days.

(21) Appl. No.: 12/382,666

(22) Filed: Mar. 20, 2009

(51) Int. Cl.
*G06Q 10/06* (2012.01)

(52) U.S. Cl.
CPC .................................. *G06Q 10/06* (2013.01)

(58) Field of Classification Search
CPC ....................................................... G06Q 10/06
USPC ........................................................ 705/7.38
See application file for complete search history.

(56) References Cited

U.S. PATENT DOCUMENTS

| | | | | |
|---|---|---|---|---|
| 6,963,826 | B2 * | 11/2005 | Hanaman et al. | 703/2 |
| 8,311,863 | B1 * | 11/2012 | Kemp | 705/7.11 |
| 2002/0052820 | A1 * | 5/2002 | Gatto | 705/36 |
| 2002/0184131 | A1 * | 12/2002 | Gatto | 705/36 |
| 2006/0059034 | A1 * | 3/2006 | Iannucci et al. | 705/10 |
| 2006/0178918 | A1 * | 8/2006 | Mikurak | 705/7 |
| 2007/0043608 | A1 * | 2/2007 | May et al. | 705/10 |
| 2007/0118419 | A1 * | 5/2007 | Maga et al. | 705/10 |
| 2008/0027789 | A1 * | 1/2008 | Busch et al. | 705/11 |
| 2008/0091517 | A1 * | 4/2008 | Koonce | G06Q 30/02 705/14.42 |
| 2008/0312986 | A1 * | 12/2008 | Braun | G06Q 10/06 705/7.22 |
| 2009/0327037 | A1 * | 12/2009 | Ng et al. | 705/10 |

\* cited by examiner

*Primary Examiner* — Kurtis Gills
(74) *Attorney, Agent, or Firm* — Pillsbury Winthrop Shaw Pittman LLP

(57) ABSTRACT

An enterprise hierarchical performance model and performance monitoring, evaluation and decision support system is disclosed to collect enterprise data, calculate and display performance information including performance, progress, and risk of one or more metrics and/or indicators, and execute an action in accordance with enterprise conditions.

42 Claims, 6 Drawing Sheets

COMPUTER SYSTEM OR PROCESS PERFORMANCE METHOD AND SYSTEM

BACKGROUND

Performance measurement is significant in enterprise management. Managers and managed persons want to understand their performance since performance leads to the ultimate success of those managers, managed persons and the organization of which they are part. Typically, the organization, such as a corporation, a partnership, etc., establishes one or more performance indicators against which the performance of managers and managed persons are assessed. Those performance indicators are measured and the performance of the managers and managed persons are determined. While electronic systems may be used in performance measurement, they may suffer one or more drawbacks and/or shortcomings.

SUMMARY

For example, conventional systems lack a systematic, enterprise approach. These systems typically operate at only one enterprise management level and do not enable performance metrics to be shared between levels. In addition or alternatively, existing systems typically focus on only a subset of key performance indicators so that managers and/or managed persons are not overwhelmed by data. As a result, if the wrong indicators are chosen, valuable information about the performance of the enterprise may not be seen. Existing performance measurement systems may also rely on manually inputted data, which is susceptible to inaccuracies and misinterpretation.

In addition or alternatively, existing performance models may have one or more of the following shortcomings:

1. they may not cover an enterprise as a whole from the employee level to the overall enterprise level;
2. performance indicators may be lost during transitions between enterprise levels;
3. performance metrics may remain unchanged after relationships between performance indicators have been established (i.e., rather than presenting the real-time operational environment with shifting goals and priorities);
4. they may lack a quantitative approach in comparing different performance indicators; and
5. performance goals on each management level of the organization may not directly relate to the performance goals of the organization as a whole.

Accordingly, in an embodiment, there is provided a system that can collect enterprise data, calculate and display performance metrics and indicators, evaluate performance risks, and execute actions in accordance with enterprise conditions. For instance, the system can comprise a data collection module to extract enterprise data and store it in a database; an administrative module to manage user access to the data; a user profile management module to allow a user to create metrics either from enterprise data or from metrics which exist in the system (e.g., created by other users); a customizable user interface to make the system available through a network or Internet-enabled device (e.g., computer terminal, laptop, mobile device, PDA, cell phone, etc.); a reporting module to enable a user to create custom reports; and a workflow engine to execute actionable items.

According to an embodiment, there is provided an enterprise hierarchical performance monitoring, evaluation and decision support system which comprises a data collection module configured to monitor, schedule, and/or collect enterprise data; a user profile management module configured to enable a user to create a metric and/or indicator based on the enterprise data; and a metrics engine configured to update the metric and/or indicator based on the enterprise data.

According to an embodiment, there is provided an enterprise hierarchical performance monitoring, evaluation and decision support method which comprises collecting enterprise data; creating a metric and/or indicator based on the enterprise data; and updating the metric and/or indicator based on the enterprise data.

It is to be understood that the summary, the brief description of the drawings, the drawings themselves, and the detailed description are not restrictive of the scope of the inventive concept described herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
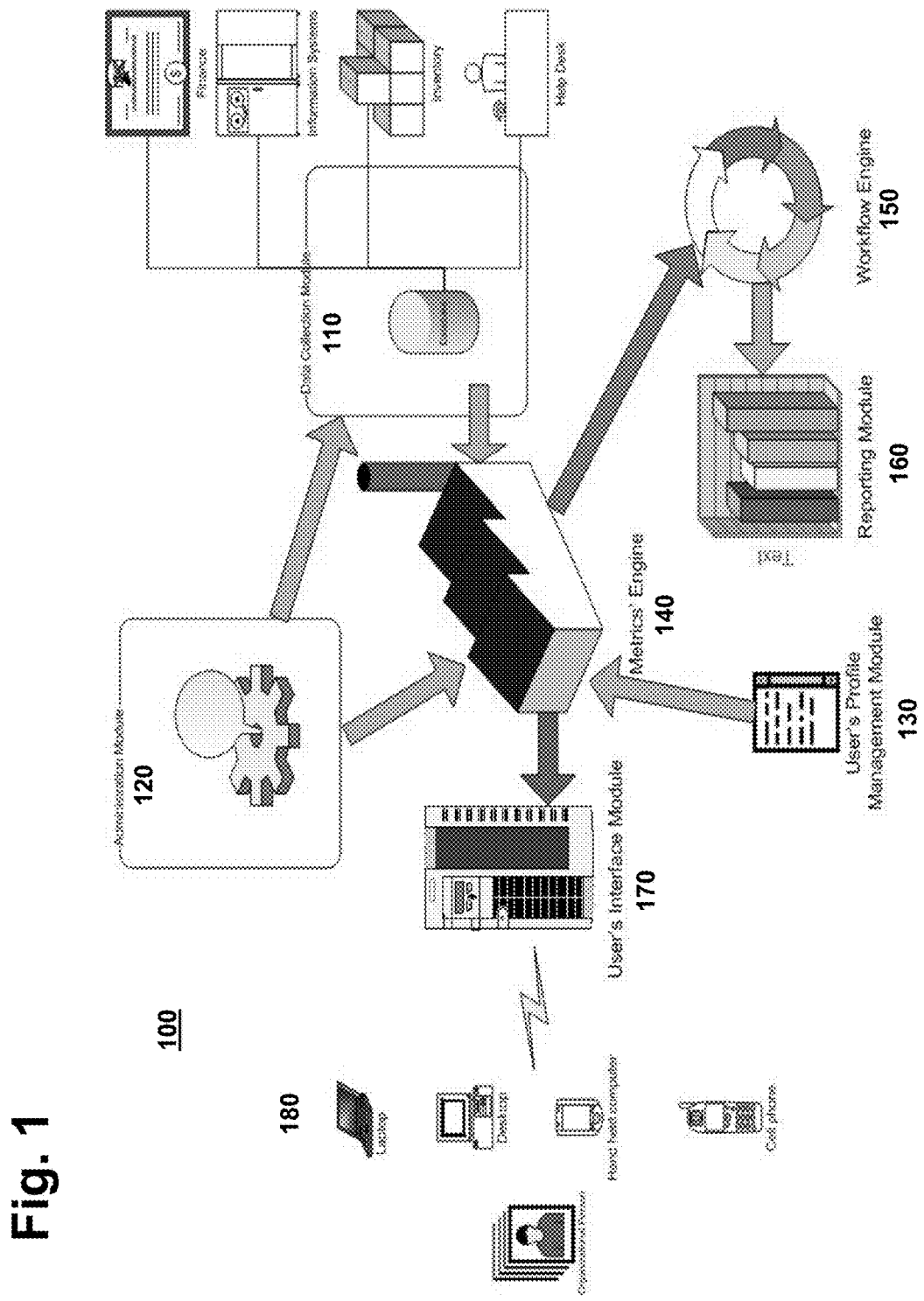
FIG. 1 shows an enterprise hierarchical performance system according to an embodiment.

FIG. 1 shows an enterprise hierarchical performance system 100 according to an embodiment of the invention. The enterprise hierarchical performance system 100 comprises a data collection module 110, an administrative module 120, a user profile management module 130, a metrics engine 140, a workflow engine 150, a reporting module 160, and a user interface module 170.

In an embodiment, data collection module 110 is configured to gather enterprise performance data and store it in persistent storage (e.g., a database). Data collection module 110 extracts enterprise data using individual monitors (e.g., agents) to collect real-time enterprise performance data values. The enterprise data may be, for example, quantitative values of the results or characteristics of a managed process or system (e.g., database loads, system response times, CPU utilization, warehouse inventories, fund disbursements, individual sales, work schedules, etc.). The monitors are dynamically configurable and receive real-time instructions on what parameters to monitor, how to monitor, and a schedule for monitoring. In particular, the monitors are configured to poll devices and applications at regular intervals to collect current data source values. Depending on the type of information being monitored, the monitors might be installed directly on the system or process being monitored or in a location that has access to the system or process being monitored.

In an embodiment, monitors run independently of each other and the other components of the enterprise hierarchical performance system 100. Consequently, hardware or networking failures will be isolated and maximum scalability may be achieved. In an embodiment, each monitor maintains a queue of data that has been collected, and every value collected from a monitored process or system will be appended to this queue. By maintaining a local queue, collected data can be preserved and a history of data reliably collected. At intervals, the metrics engine 140 will poll each of the monitors, or the monitors will automatically act, to supply the values from the queue. Therefore, all of the enterprise data can be centralized and stored in persistent data storage.

In an embodiment, the monitors are lightweight software services that collect data from, or determine or measure data of, a monitored process or system. In an embodiment, the monitors comprise one or more of the following features: a Web service interface to communicate with metrics engine 140, a plug-in (or connector) architecture that defines an interface to create new monitors, a configuration interface to define monitors and monitor parameters (e.g. polling intervals, file locations, device names, etc.), a timed thread to collect data from, or determine or measure data of, a monitored process or system at polling intervals defined by the configuration, and a local queue to store the data.

In an embodiment, data collection module 110 is configured to process uploaded data files by extracting values of those performance parameters that cannot be monitored automatically. In an embodiment, data collection module 110 can process files of different formats that include, but are not limited to the following: comma-delimited, xml, Microsoft Excel, Microsoft Project, Microsoft Access, Microsoft Word, csv, and html. In a further embodiment, data collection module 110 may also be configured to allow manual data entry via web electronic forms of those performance parameters that cannot be monitored automatically.

Management of the enterprise hierarchical performance system 100 can be performed by administrative module 120. For example, such management may include creating, editing, and deleting metrics and/or indicators (further discussed below), and creating and editing scoring functions (further discussed below) for the metrics. The organization of the metrics and/or indicators according to the enterprise's organizational structure may be performed by manually associating each metric and/or indicator with each other and members of an organization or may be performed using a graphic computer linking method to associate each metric and/or indicator with each other and members of an organization. In essence, this establishes a tree of metrics and/or performance indicators representing the organization structure (and which may be visualized in a score card (and any associated nested score cards) as discussed below). Further, such management may include adding or deleting users, assigning users to metrics, and configuring users' access to the system and what they can view. Further, such management may include the establishment and maintenance of enterprise-wide performance criteria (further discussed below), creating, editing, and/or deleting status levels (further discussed below), risk levels (further discussed below), and/or threshold values (further discussed below). Further, such management may include managing display of performance information using various visualization templates (e.g., adding and deleting visualization templates (based on a library), creating user interface screens from visualization templates, and/or assigning metrics to historical data views on user interface screens). Further, such management may include establishing monitoring parameters by specifying monitoring type (automatic monitoring, manual data entry, or data file processing), monitoring method (where it is located, access method, monitoring procedure), and monitoring schedule.

Users can select and/or customize metrics and risks using user profile management module 130. For example, a user may select a preexisting performance metric, performance indicator or risk metric. Alternatively or additionally, a user may customize an existing composite metric by assigning weights and/or risk levels for metrics and indicators, including composite metrics and indicators.

When new enterprise data is received from the monitors, performance information can be updated by metrics engine 140. For example, the metrics engine 140 can calculate, as described in more detail below, metric scores, evaluate alerts, and perform historical analyses (e.g., for risk analysis). The metrics engine 140 may have a main data repository that includes all data from the monitors. During data collection from the monitors, the metrics engine 140 may keep track of which monitors have reported new data. At the end of the data collection, the metric engine 140 may iterate over the list of monitors with updated values and calculate updated metric scores. Metric scores may also be stored in the data repository to allow for historical analysis used in risk calculations. During metric score calculation, any necessary alerts can be generated.

Based on the performance information generated by metrics engine 140, workflow engine 150 can perform a certain action if certain performance conditions occur. The actions may include sending a message when a performance goal has been exceeded, scheduling and informing participants of a conference call via email or phone, or initiating a backup system. Further, workflow engine 150 can distinguish between background actionable items which are executed without notification or authorization; actionable items executed with notification of their execution; and actionable items that require authorization.

Performance information can be communicated to users by reporting module 160 which enables users to create custom reports (e.g., standard or ad-hoc) from operational and/or historical enterprise data. The data may include raw data, performance metrics and indicators, risk metrics and indicators, progress metrics and indicators, etc. for which the user has been granted access. Reports may include tables or graphic charts which can be automatically sent to users at certain times. Performance information can also or alternatively be viewed by users via user interface module 170 (e.g., using a computing device 180 such a mobile phone, laptop, desktop, etc.). User interface module 170 can display performance information (e.g., metrics and risks) with associated numerical values and colors, and can customize the display of performance information. Further, users can drill down through metrics and indicators to view raw data, and in the case of composite metrics and indicators, the metrics and/or indicators from which the composite metrics and indicators are derived. Further, user interface module 170 can be configured to allow users to create customizable displays by choosing different viewing templates for different parts of a screen, and can support user account maintenance.

Figure 2:
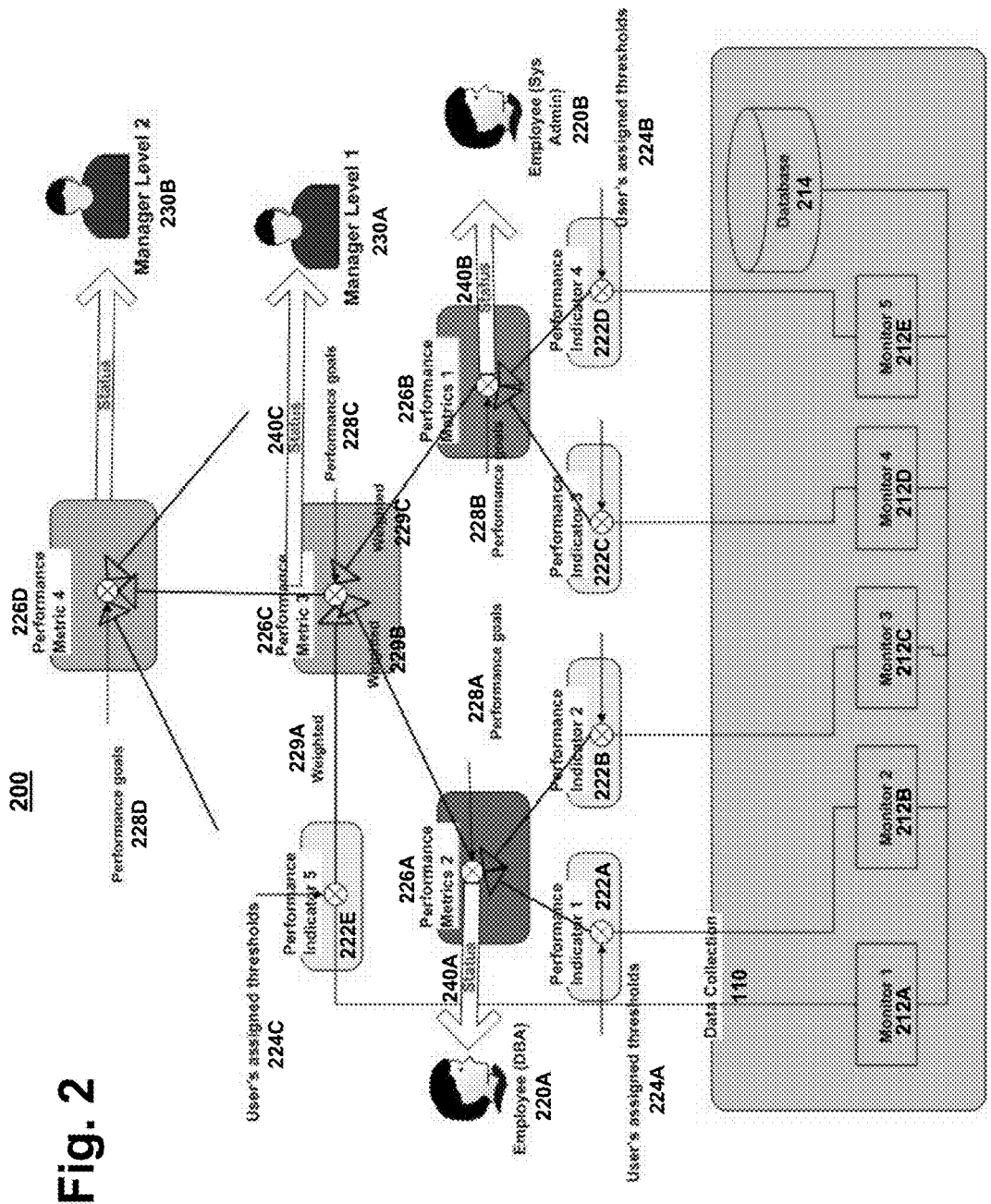
FIG. 2 shows an enterprise hierarchical performance model according to an embodiment.

FIG. 2 shows a hierarchical performance model 200 comprising a hierarchical set of performance metrics 226, indicators 222, and risks which follows an enterprise organizational chart. Enterprise data can be monitored and collected from human and/or computer data sources and stored in database 214 to generate enterprise performance information. Enterprise data can include values of monitored parameters 212, e.g., quantitative values of the results or characteristics of a managed process or system which can be determined or measured and evaluated, such as hardware load, response time, or the number of help desk tickets open. To collect enterprise data, software monitoring agents 212 can be configured to poll device and software application data sources at regular intervals. Depending on the type of source or data, monitoring agents 212 may access the monitored sources remotely or be installed locally on the sources.

After enterprise performance data has been collected, performance indicators 222 can be computed based on monitored parameter values 212. For example, an indicator for CPU or network performance can be determined as a function of the degree of utilization. In addition, more complex functions may be created using loops, control structures, and built-in functions; and by comparing current monitored values to historical monitored values.

A metric 226 is an object that represents the current operational state of a physical system or enterprise process. A metric may comprise any combination of performance indicators and/or metrics to derive an operational state. Metrics are created by users (or developers) and are used, for example, within a score card as discussed further below. A metric typically has the following attributes: Name—the name that will be displayed on the score card and is used for referencing in other metrics, Score—a value, for example between 0 and 100, that represents the operational state of the metric along a continuous spectrum, Status—a discrete value that represents the operational state of the metric and is calculated by applying the enterprise-wide status configuration to the score, Scoring Function—a function that calculates the score for the metric based on the values of performance indicators and/or other metrics, and Status Level Messages—messages that provide more information about what the metric's status means.

The scoring function drives the information provided by a metric and returns the score; the score in turn drives the status and provision of status level messages. The scoring functions may be defined using an expression-language with, e.g., a C-like syntax. Some relatively simple examples of how a scoring function (where Score is the result of the function, and Value is the current value of a performance indicator) might be implemented are shown below, but more complex functions may be created using loops, control structures, and built-in functions, and by comparing current Values to historical Values.

Example—CPU Utilization

For CPU utilization, values range from 0% to 100% where a lower number represents better health of the system. Consequently, the scoring function will simply reverse the percentage to get a performance Score.
Score=100−Value
Sample results: Value=0, Score=100; Value=25, Score=75

Example—Network Bandwidth Utilization

For network bandwidth, a certain percentage of utilization being consumed at all times is sufficient, so a reduction of the Score should only occur in cases where the Value exceeds a certain threshold (in this example, 60%). Also, note that the Score will always be capped at 100.
Score=(100−Value)×2.5
Sample results: Value=0, Score=250=>100; Value=60, Score=100 (minimum threshold); Value=80, Score=50; Value=100, Score=0

Performance metrics 226 can be derived from weighted performance indicators and/or metrics 229 from the same or lower enterprise levels within a manager's or managed person's scope of responsibility. For example, metric 226C for manager 230A can be based on a composite function of metric 226A weighted by weight 229B and of metric 226B weighted by weight 229C, metrics 226A and 226B associated with employees 220A and 220B, respectively. The composite function of metric 226A may further include performance indicator 222E weighted by weight 229A. Performance metrics 226 can also compare monitored parameters 212 and/or metrics with performance goals 228 derived from the same or higher enterprise levels. For example, performance goals 228C of manager 230A can be derived from performance goals 228D, which are associated with manager 230B. In addition or alternatively, performance goals 228C of manager 230A can be derived from performance goals 228A and 228B, which are respectively associated with employees 220A and 220B.

As an example of a weighting function, each metric or indicator that makes up a composite metric may be accorded an equal weight and thus, the score of the composite metric comprises an equal proportion of the score of each constituent metric or indicator. If the weight of one or more of the constituent metrics or indicators is increased relative to another, then that increased weight metric(s) or indicator(s) will have a greater impact on the composite metric function score. In some cases, more complicated weighting functions may be created or provided. For example, it may be desired that if one particular constituent metric or indicator has a zero score, the composite metric score should be zero. Thus, a programmatic weighting function may be provided that returns the appropriate value (e.g., in this example, with four constituent metrics or indicators—if (score[0]==0) return 0; else return (score[0]+score[1]+score[2]+(score[3])/4). Such a weighting function may defined using an expression-language with, for example, a C-like syntax.

Performance metrics 226 can be normalized and include contextual information about the type of data reported, a score to indicate the performance of monitored parameter values 212, and a status 240 to indicate the current operational state of the metric. For example, performance metrics 226 can be normalized so that the same score represents a similar operational state for all metrics 226 in the enterprise (e.g., scores below 85 indicate an abnormal state). In particular, a score less than 85 could indicate that a hardware device is near capacity, a software program contains too many bugs, or that a financial budget has been exceeded.

In addition, scores can compared to thresholds 224 to determine performance status levels 240 for metrics 226 (e.g. OK, ERROR, WARNING, CRITICAL, FATAL, etc.). Status levels 240, in turn, may be used to determine a color of metric 226 for display in user interface 170, generate alerts 512, etc. Therefore, users can see the status of the enterprise without being overwhelmed with data.

In an embodiment, the thresholds are configured as a set of discrete status levels. For example, there may be at least 2 states—one to represent normal status (e.g. OK) and another to represent abnormal status (e.g. ERROR). Additional states may be desired to provide a more fine-grained status report (e.g. WARNING, CRITICAL, FATAL). In an embodiment, the scoring thresholds may be distributed proportionally according to the number of status levels. See the following tables for examples of score thresholds for 3, 4, and 5 status levels (where the score ranges from 0 to 100).

| Status | Score |
|---|---|
| OK | 100 |
| WARNING | 50 |
| ERROR | 0 |

| Status | Score |
|---|---|
| OK | 100 |
| WARNING | 66 |
| ERROR | 33 |
| CRITICAL | 0 |
| OK | 100 |
| WARNING | 75 |
| ERROR | 50 |
| CRITICAL | 25 |
| FATAL | 0 |

In addition, risk analysis can be performed to anticipate performance problems which may develop in the future. In other words, while performance metrics 226 show current and past enterprise performance information, risk metrics 226 project future enterprise conditions. Risk metrics 226 may include performance degradation risks (dynamic), which determine risk levels based on the length of time it will take performance metrics to exceed threshold values based on historical enterprise data. Thus, performance degradation risks are calculated to project if the future operational state will exceed a defined threshold for a metric. Projections are made by extrapolating a metric's historic scores. The risk analysis is then based on when (or if) this metric will cross a risk level threshold.

Additionally or alternatively, they may include performance non-continuity risks, which determine risk levels based on the duration that performance metrics have been near threshold values. Performance continuity risks are calculated to determine if the enterprise is historically operating within a threshold. This kind of risk is calculated by examining the historical scoring performance of the metric being analyzed. An example performance continuity risk calculation is to determine if a metric has been operating in an abnormal state for a defined amount of time. So, for example, while an abnormal status by itself does not necessarily impose a risk, a prolonged abnormal status introduces the risk. The longer a metric has an abnormal status, the higher the risk. The following example shows how a performance continuity risk might be configured for a metric in an enterprise that is configured with three status levels (OK, WARNING, and ERROR).

| Metric Status Level | Time at Status Level | Risk Assessment |
|---|---|---|
| WARNING | 24 hours | MEDIUM |
| WARNING | 48 hours | HIGH |
| ERROR | 60 minutes | MEDIUM |
| ERROR | 120 minutes | HIGH |

Risk functions and levels can be defined when configuring metrics 226. For example, enterprise risk levels can be defined to represent various degrees of perceived risk for metrics 226 including, for example, NONE, LOW, MEDIUM, HIGH, CRITICAL, etc. Further, thresholds can be assigned to each risk level to be used when calculating performance degradation risks. In an embodiment, only successful performance metrics and successful performance indicators require risk assessment since there may not be a need to assess risk of failed performance indicators.

As discussed above, the real-time operational state of metrics defined in the system may be monitored and their status reported to users. In addition or alternatively, the system provides a mechanism to perform one or more actions when the status of a metric is discovered to be in an abnormal state. In an embodiment, this status reporting and action initiating may be implemented using a messaging system that comprises a topic corresponding to each metric. If any of the metrics is found to be in an abnormal state (e.g. ERROR), an event message will be published to the corresponding metric topic. The event message will include the current status of the metric, the message associated with the status, and any other details provided by the monitors used in the metric. One or more components may subscribe to and listen for event messages.

So, an alert system may be a subscriber and listen for particular event messages and dispatch an appropriate alert (e.g., an e-mail alert to a user). The alert system may have, for example, a subscription to receive all event messages. When messages are received from this subscription, they will be logged to an event log. Alternatively, the alert system may have, for example, a subscription to receive messages from selected metrics for a particular user. There may be an unlimited number of these subscriptions. When messages are received from these subscriptions, an alert will be provided to users that contain information about the status of the metric. Based on the subscription, users will only be sent information about metrics they are interested in. This type of subscription may be managed based on user preferences. A configuration interface may be provided to a user that will enable choice of metrics to be included in the notification process. The interface also allows the user to specify one or more notification email addresses.

Similar to the alert system, an action system may be a subscriber and listen for particular event messages and then appropriately initiate a specific action (e.g., enabling a backup system, scheduling a conference call, etc.). Similar to alert notifications, the action system may only subscribe to certain event types. If a message is published for which the action system is subscribed, an action process will be initiated. The action may defined by a process definition of the action to be launched. The definition may include: a host name or IP address; SSH login credentials (username, password, SSH key, etc.), a process name or shell script to launch, and timing, delay, repeat intervals, etc.

According to an example of hierarchical performance model 200 shown in FIG. 2, database administrator 220A may derive his performance indicators 222A and 222B from quantitative and verifiable parameters 212B and 212C (e.g., hardware load, database response time, number of open help desk tickets, etc.). Similarly, system administrator 220B may derive his performance from parameters 212D and 212E. Each employee 220A and 220B can view performance status (240A and 240B, respectively), which is based on respective performance goals 228A and 228B.

In addition, IT department manager 230A may derive a performance status 240C based on the performance of his one or more managed persons and/or one or more persons on which his performance depends. For example, manager 230A may derive her performance from employees 220A and 220B using performance metrics 226A and 226B. She may also be responsible for overall progress against a certain schedule and may evaluate earned value based on financial information. Accordingly, she may also have her own service performance indicator 222E based on a service-level agreement with customers and financial performance indicator reflecting ROI. All of these metrics and indicators are combined with different weights 229A, 229B, and 229C into a composite performance metric 226C. Further still, by comparing performance metric 226C of manager 230A and performance goals 228D, a company's CEO 230B may derive her performance based on her own metric 226D.

While the above embodiment has been described in relation to an IT function, the embodiment may be applicable to any enterprise function and process. For example, the manager may be responsible for a software development project and the employees may be individual developers, testers, and configuration managers involved in the software development, the performance data being, e.g., source code development progress data determined or measured and verified through monitoring of source code repositories, test results, and configuration of different environments.

An optional attribute of all metrics is the concept of progress. Typically, a metric is responsible for evaluating the operational state of a particular system or process. However, it is also possible to configure metrics to report a progress percentage. This is especially useful in Project Management settings where tracking of the performance of a project's implementation is desired. In this setting, the completion percentage of each task on a Work Breakdown Structure (WBS) would be useful. See, e.g., FIG. 4.

A metric may have a flag that indicates whether it is a progress metric. When this flag is enabled, the score card will use and display the metric differently. The score card will display a progress (or completion) percentage. In an embodiment, the progress metric is displayed as a node on a score card as a WBS task, and a corresponding status metric for the same task is included that reports if the task is on-time or behind schedule. Thus, a user viewing the score card to see not only the completion progress of all tasks but also if these tasks are being completed on schedule.

In an embodiment, the system may be used for Earned Value Management (EVM). EVM is based on measurements of three values: planned value (PV), or how much money (hours) was planned to be spent by a certain time; actual cost (AC), or how much that has been actually spent by that time; and earned value (EV), or how much money was planned to be spent for the status of the schedule at that time.

The system may include a visualization template to provide EVM display. See, e.g., FIG. 5. That template uses metrics to provide the three EVM parameters described above: PV, AC, and EV. The EVM template then uses these metrics to display graphs containing these values as well as indexes based on these values: Cost Performance Index (CPI)—the ratio of EV to AC; and Schedule Performance Index (SPI)—the ratio of EV to PV.

To provide EVM metrics, the system should have access to four data sources: planned schedule, planned budget, actual work done, and real-time information from a financial system. The planned schedule can be provided as a project plan or Work Breakdown Structure (WBS). Planned budget can from, e.g., a contractor's cost proposal. The actual work done and financial information can come from ERP systems or other systems tracking project performance and finances. Where the data is not accurate or complete, projections may be used (e.g., based on prorated expenses, on preliminary reporting, or on estimates of the work completed).

Figure 3:
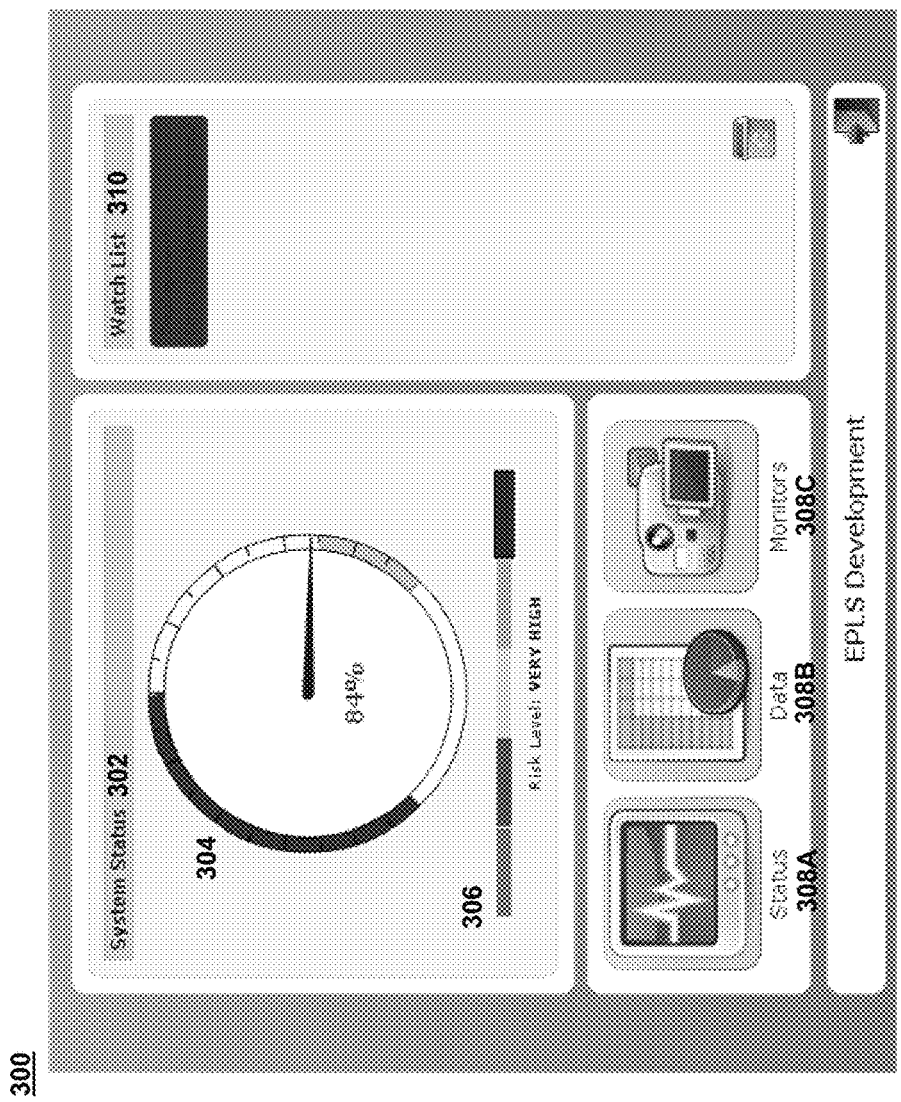
FIGS. 3-5 show user interfaces according to various embodiments.

FIG. 3 shows user interface 300 according to an embodiment. Enterprise system status 302 can be displayed using dial 304 to represent an overall enterprise score, and bar graph 306 to represent an overall enterprise risk level. Icons 308A, 308B, and 308C can be provided to enable users to select additional displays for performance information, e.g., data or monitors. In particular, users can view detailed historical data 308B of metrics 226 over a selected time period, and performance values and states 308C of performance monitoring agents. Further, watch list 310 displays metrics, indicators, events, etc. which users want to monitor separately from other performance information.

The display of performance information can be customized with visualization templates. By creating a variety of visualization templates, different performance information and display formats can be selected to provide customized views of performance information. Visualization templates may be created to give the alternate methods for viewing performance information, including, e.g., a customized view of historical data for one or more metrics.

In an embodiment, configuring a visualization template involves two steps. First, a template is constructed with one or more data views. Second, a user interface screen is created based on the template with the metrics that should be displayed mapped to each of the one or more views. The one or more data views may give a visual representation of data for one or more metrics. A data view may take, for example, one of the following forms: Line Graph—displays a historical line graph for a metric's score; Bar Graph—displays a historical bar graph for a metric's score; or Score Table—displays historical metric values in a tabular form. Each data view may be configured to view one or more metrics. For graphs, data for multiple metrics would be overlaid on the same graph. For tables, data for multiple metrics would be displayed in separate columns. Data views may be fixed to a certain time period or may allow the user to select a custom date range. In addition, graphs with multiple metrics may be configured so that a user can show or hide each of the metric data series.

A new user interface screen may be created based on a visualization template. Each data view in the template is then configured by editing text values for labels and by assigning the desired metric(s) to the view. This feature allows the same template to be reused to create similar screens with different labels and metrics on each screen. A user interface screen may be dynamically added, edited, or removed at any time.

Figure 4:
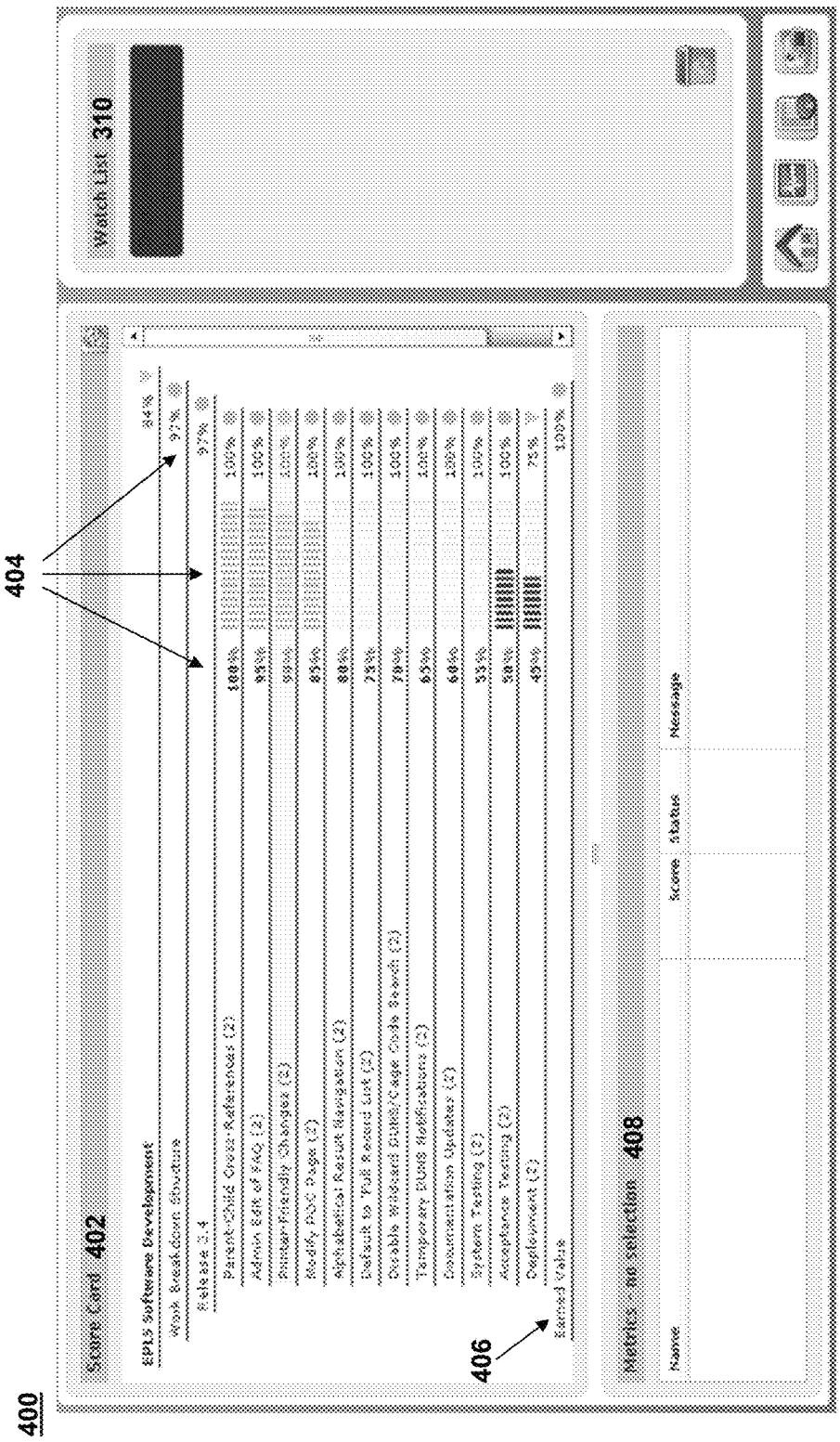

FIG. 4 shows user interface 400 according to an embodiment comprising a score card 402. Score card 402 can comprise performance information 404 (e.g., related one or more metrics and/or one or more indicators) and/or one or more nested score cards (e.g., nested score card 406). In particular, nested score cards can be selected to display performance information for lower levels of the enterprise hierarchy, such as metrics, indicators, and associated scores, used to calculate performance information 404 on score card 402. Thus, score card 402 comprises a collection of related metrics and/or indicators and one or more nested score cards, which include related metrics and/or indicators at a different nesting level. A score is presented for each leaf of a score card's tree using, e.g., the scoring function of the metric depicted on the leaf.

Thus, through the score card 402 and any nested score card 406, a user can drill down from an overall metric (e.g., that of a CEO) down to the metrics and/or indicators that make up that overall metric and down further into those sub-metrics, etc., all along seeing the score for each leaf of the score card. This nesting enables display of a hierarchy of inter-connected score cards, and thus metrics and indicators, that maps the structure of the enterprise. For example, a CIO might have a score card that simply contains the 3 nested score cards of his or her 3 direct subordinates. One of these subordinates might be a Program Manager responsible for a portfolio of 5 IT projects. His or her score card would then contain 5 nested score cards, one for each project. Each of these score cards would belong to the Project Manager responsible for each these projects. With these nesting levels, the real-time operational performance of each of these IT projects will be reflected in the real-time score of the Program Manager and the CIO. In addition, the CIO can drill down to the Program Manager's and Project Manager's score cards to view the details of the metrics and/or indicators.

Further, metrics can be selected for display 408 to enable more details of the metrics to be viewed, and watch list 310 can provide monitored performance information.

Figure 5:
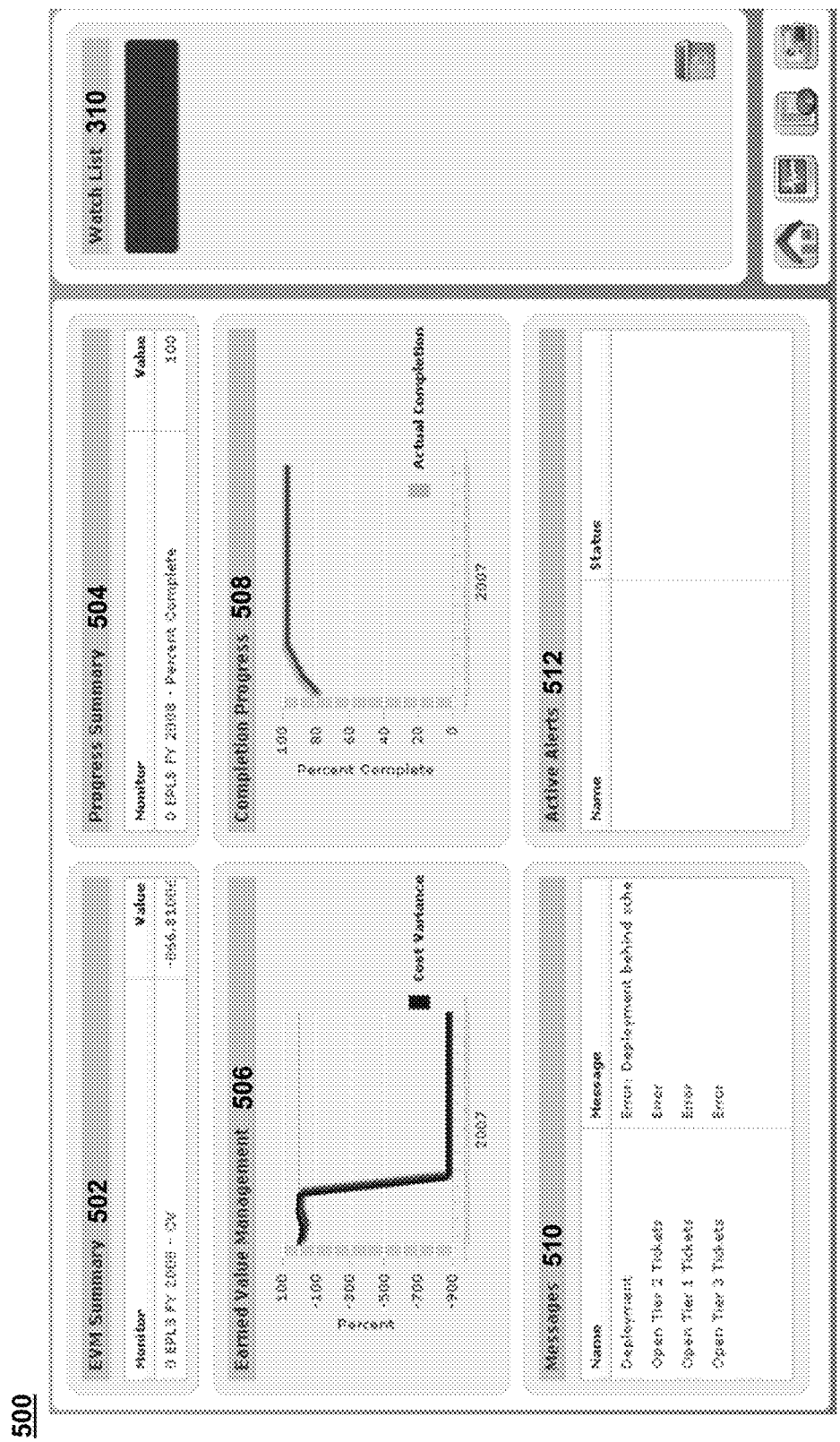

FIG. 5 shows user interface 500 comprising details of nested score card 406. Nested score card 406 can be configured to track metrics for cost performance 502 and schedule performance 504 of an earned value management (EVM) project implementation. EVM metrics can include planned value (i.e., estimated value of work to be accomplished to date); actual cost (i.e., actual expenditures to date); and earned value (i.e., budgeted cost of work performed to date). In particular, the user can view cost variance 506 and completion progress 508 performance indicators.

User interface 500 may also comprise a watch list 310 to provide monitored performance information.

User interface 500 can also display messages 510 and alerts 512. In particular, metrics 226 can be updated when new performance values 212 are received. If a metric 226 is determined to meet certain conditions (e.g., ERROR), an event message 510 comprising, for example, a message and metric status can be generated for display, or an alert 512 may be issued. For example, alerts 512 can be sent via email to users having particular profiles or who have registered to be notified of particular events. Alerts 512 can also be listed in an alert log so that users can view active alerts, or they can be stored to provide a historical record of alerts.

The following table outlines some of the functions that may be provided by the user interface (home) 300, user interface (score card) 400, user interface 500 and/or other user interfaces:

| Component | Sub | Feature |
|---|---|---|
| General | Authentication | Username and password are required to use the system. |
| General | Watch List | Watch list visible on every screen. |
| General | Watch List | Contains a list of metrics that have been added for viewing at all times. Each item in the list displays the metric name and metric status. Metrics may be deleted from the watch list. |
| Home | Overall Score | A dashboard gauge displays the overall score. |
| Home | Overall Risk | Dashboard displays performance continuity and/or performance degradation risks. |
| Home | Navigation | Navigation menu will provide links to other components: Score Card, Data, Monitors. |
| Home | Logout | Link to logout the current user session. |
| Score Card | Scores | A nested tree view of the current user's score card is displayed with scores and status indicators for the nodes of the tree. |
| Score Card | Progress | Nodes with progress metrics also display a completion percentage indicator. |
| Score Card | Node Metrics | The details of the metrics contained in a score card node are displayed when a user clicks on the node. |
| Score Card | Nested Score Cards | If a user clicks on a node that contains a nested score card, the existing score card is replaced with the contents of the nested score card. A navigation link allows the user to return to his or her score card. |
| Score Card | Metrics Table | A metrics table displays the details of metrics when a user clicks on a score card node. A particular metric may be added to the watch list by dragging it from the metrics table to the watch list. |
| Score Card | Navigation | Navigation menu will provide links to other components: Home, Data, Monitors. |
| Score Card | Score History | A popup window of historical data is accessible for each node that provides a limited view of historic scores for that node. |
| Data | Alert Log | Provides a list of active alerts for metrics included in the user's score card. |
| Data | Alert History | Provides a historic view of alerts that have occurred for metrics included in the user's score card. |
| Data | EVM | Provides a historical graph with an overlay of EVM metrics configured for the user. |
| Data | Project Status | Provides a historical graph with an overlay of project status metrics (e.g. WBS Task Completion, Passed Test Cases, Open Bugs, etc.). |
| Data | Continuity Risk | Provides a historical graph for each continuity risk metric configured for the user. |
| Data | Degradation Risk | Provides a historical graph and future extrapolation for each degradation risk metric configured for the user. |
| Monitors | Monitors | A table displays the status/values of all monitors configured for the enterprise. |
| Monitors | History | The user can view a graph of historical data for each monitor and overlay data for multiple monitors. |
| Reports | PDF | Score card can be extracted in PDF format. |
| Reports | Excel | Score card can be extracted in Excel format. |
| Reports | Graphs | Any graph (EVM, Project, Risks, Monitor History) can be extracted in PDF format. |
| Weights | Controls | Interface to configure weights for each node in the user's metric. |
| Weights | Visualization | Display for demonstrating how changes to weights will affect scores. |

-continued

| Component | Sub | Feature |
| --- | --- | --- |
| Custom Screens | n/a | Custom user interface screens are dynamically constructed based on configuration of visualization templates |

Figure 6B:
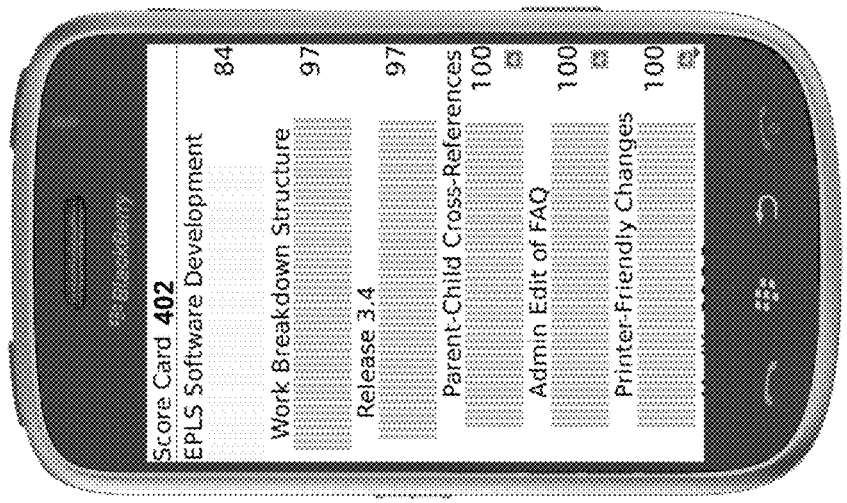
FIGS. 6A and 6B show a mobile user interface according to an embodiment.
Figure 6A:
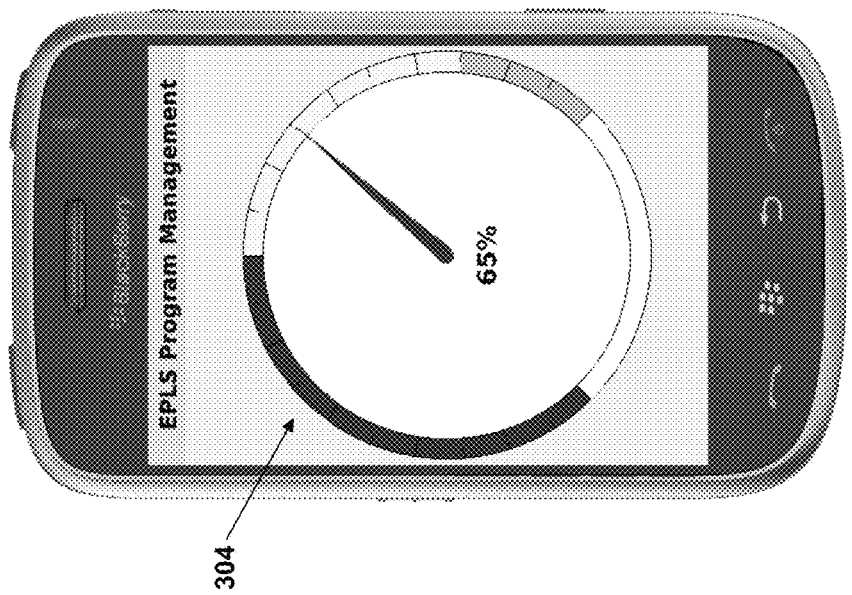

FIGS. 6A and 6B show a mobile user interface configured to provide a compact view of performance information on a mobile device. For example, mobile user interface 600A can display an overall enterprise performance score using graphical dial 304. Further, mobile user interface 600B can display performance information 404 using score card 402 (e.g., through clicking on the dial 304). In particular, score card 402 can display performance information for the current enterprise level and/or nested score cards to view lower level enterprise metrics, risks, indicators, etc. The following table outlines some of the functions that may be provided by the mobile user interface 600:

| Component | Sub | Feature |
| --- | --- | --- |
| General | Authentication | Username and password are required to use the system. |
| Home | Overall Score | A dashboard gauge displays the overall score. |
| Home | Navigation | Navigation menu provides links to other components: Score Card, Data, Monitors. |
| Home | Logout | Link to logout the current user session. |
| Score Card | Scores | A nested tree view of the current user's score card is displayed with scores and status indicators for the nodes of the tree. |
| Score Card | Progress | Nodes with progress metrics also display a completion percentage indicator. |
| Score Card | Node Metrics | The details of the metrics contained in a score card node are displayed when a user clicks on the node. |
| Score Card | Nested Score Cards | If a user clicks on a node that contains a nested score card, the existing score card is replaced with the contents of the nested score card. A navigation link allows the user to return to his or her score card. |
| Score Card | Metrics Table | A metrics table displays the details of metrics when a user clicks on a score card node. |

In this specification and the accompanying drawings, reference is made to particular features of embodiments of the invention. It is to be understood that the disclosure in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments and Figures, and in the invention generally.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" elements, this is generally done for identification purposes; unless the context requires otherwise, the first and second elements can be the same or different, and reference to a first element does not mean that a second element is necessarily present (though it may be present). Where reference is made herein to "a" or "an" element, this does not exclude the possibility that there are two or more such elements (except where the context excludes that possibility). Where reference is made herein to two or more elements, this does not exclude the possibility that the two or more elements are replaced by a lesser number or greater number of elements providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

One or more of the embodiments of the invention may be implemented as apparent to those skilled in the art in hardware or software, or any combination thereof. The actual software code or specialized hardware used to implement an embodiment of the invention is not limiting of the invention. Thus, the operation and behavior of the embodiments often will be described without specific reference to the actual software code or specialized hardware components. The absence of such specific references is feasible because it is clearly understood that artisans of ordinary skill would be able to design software and hardware to implement the embodiments of the invention based on the description herein with only a reasonable effort and without undue experimentation. For example, a software database system with an appropriate software front-end (e.g., SQL scripts and calculation methods) may be implemented to practice all or part of the enterprise hierarchical performance system 100.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein. Useful machines for performing operations of one or more embodiments of the invention include general purpose digital computers or similar devices.

Each step of the method may be executed on any general computer, such as a mainframe computer, personal computer or the like and pursuant to one or more, or a part of one or more, program modules or objects generated from any programming language, such as C#, C++, Java, Fortran or the like. And still further, each step, or a file or object or the like implementing each step, may be executed by special purpose hardware or a circuit module designed for that purpose. For example, an embodiment of the invention may be implemented as a firmware program loaded into nonvolatile data storage medium or a software program loaded from or into a data storage medium as machine-readable code, such code being instructions executable by an array of logic elements such as a microprocessor or other digital signal processing unit.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified.

An embodiment of the invention may desirably be implemented in a high level procedural or object-oriented programming language to communicate with a computer. However, an embodiment of the invention may be implemented in assembly or machine language, if desired. In any case, the language may be a compiled or interpreted language.

An embodiment of the invention may be implemented as an article of manufacture comprising a computer usable medium having computer readable program code means therein for executing the method steps of an embodiment of the invention, a program storage device readable by a machine, tangibly embodying a program of instructions executable by a machine to perform the method steps of an embodiment of the invention, or a computer program product, or an article of manufacture comprising a computer usable medium having computer readable program code means therein, the computer readable program code means in said computer program product comprising computer readable code means for causing a computer to execute the steps of an embodiment of the invention or a computer readable medium encoded with a set of executable instructions to perform the method steps of an embodiment of the invention. Such an article of manufacture, or computer program product, or computer usable medium may include, but is not limited to, CD-ROMs, diskettes, tapes, hard drives, computer system memory (e.g. RAM or ROM) and/or the electronic, magnetic, optical, biological or other similar embodiment of the program.

An embodiment of the invention may be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone, PDA or laptop).

The system may be specially constructed for the required purposes to perform, for example, the method steps of an embodiment of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While one or more embodiments of the invention have been described, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention. Many modifications and variations are possible in light of the above teaching. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

The invention claimed is:

1. A computer product, comprising a non-transitory, tangible medium to implement a computer system or process performance system, the medium having program code embodied therewith, when executed by a computing device, to at least:

collect quantitative values of results or characteristics of a computer system or process, the results or characteristics corresponding to one or more selected from: a database load, a hardware load, a database response time, a computer system response time, a central processor unit utilization, and/or a computer network performance, wherein at least some of the quantitative values are electronically obtained from a device in the computer system or process or obtained by measurement within the computer system or process;

enable a user associated with the computer system or process to create a metric representing performance of at least an aspect of the computer system or process that is a function of a plurality of different first metrics, each first metric of the plurality of different first metrics representing performance of at least a different type of aspect of the computer system or process, and each first metric of the plurality of different first metrics being a function of a plurality of second metrics, a plurality of indicators, or a combination of one or more second metrics and one or more indicators, each second metric and/or indicator representing performance of at least an aspect of the computer system or process and corresponding to a different result or characteristic of the computer system or process and at least one metric of the metrics being for the same or a lower computer system or process management level than at least one other metric of the metrics;
update the user metric based on the quantitative values; and
cause an action or change within the computer system or process other than, or in addition to, an alert or report, responsive to a particular performance condition occurring based on the user metric to cause remediation, continuity or recovery of the computer system or process.

2. The computer product of claim 1, wherein the program code is further configured to construct the user metric based on the quantitative values.

3. The computer product of claim 1, wherein the user metric is normalized based on enterprise-wide performance criteria.

4. The computer product of claim 1, wherein the user metric comprises normalized first metrics and/or indicators and weights corresponding to each normalized first metric and/or indicator.

5. The computer product of claim 1, wherein the user metric is organized within a hierarchical tree based on an enterprise structure.

6. A computer product, comprising a non-transitory, tangible medium to implement a computer system or process performance system, the medium having program code embodied therewith, when executed by a computing device, to at least:
collect quantitative values of the results or characteristics of a computer system or process, wherein at least some of the quantitative values are electronically obtained from a device in the computer system or process or obtained by measurement within the computer system or process;
enable a user to create a metric representing performance of at least an aspect of the computer system or process, the metric being a function of a first different metric and of an indicator and/or a second different metric, each of the first different metric, the indicator and the second different metric representing performance of at least a different type of aspect of the computer system or process;
update the user metric based on the quantitative values;
evaluate the user metric against a performance goal for at least an aspect of the computer system or process that is a function of a plurality of different performance goals of at least the aspect of the computer system or process, the plurality of different performance goals comprising a performance goal associated with a metric that is a function of the user metric and at least one performance goal of the plurality of different performance goals being associated with the first different metric; and
cause an action or change within the computer system or process other than, or in addition to, an alert or report, responsive to a particular performance condition occurring based on the evaluation of the user metric against its performance goal to cause remediation, continuity or recovery of the computer system or process.

7. The computer product of claim 1, wherein the user metric is compared to a threshold value.

8. The computer product of claim 1, wherein the program code is further configured to recognize unconditional actions, actions that required notification, and actions that require approval.

9. The computer product of claim 8, wherein the program code is configured to accept approval for an action from an authenticated user via a secure Internet connection.

10. The computer product of claim 1, wherein the program code is further configured to manage user access to the quantitative values and/or user metric.

11. The computer product of claim 10, wherein the program code is further configured to select monitoring parameters and configured to create monitoring procedures and monitoring schedules.

12. The computer product of claim 10, wherein the program code is further configured to create visualization templates.

13. The computer product of claim 1, wherein the program code is further configured to create a custom report based on the user metric.

14. The computer product of claim 13, wherein the user can schedule execution and electronic delivery of the report.

15. The computer product of claim 1, wherein the program code is further configured to provide a user interface to display the user metric.

16. The computer product of claim 15, wherein the user interface allows a user to customize screen appearance by choosing a visualization template.

17. The computer product of claim 15, wherein the user interface allows a user to drill-down through the user metric.

18. The computer product of claim 15, wherein the program code is further configured to provide a user interface enabled for a mobile device.

19. The computer product of claim 15, wherein the user interface provides a list of performance indicators that indicate failed performance.

20. The computer product of claim 15, wherein the user interface provides a list of events or alerts.

21. The computer product of claim 1, wherein the program code is further configured to determine a value of risk that at least part of the computer system or process has a degradation in performance based on an approximation of a length of time it will take for the user metric to reach a threshold value.

22. The computer product of claim 1, wherein the program code is further configured to determine a value of risk that at least part of the computer system or process has a non-continuity in performance based on a time period value for which the user metric is proximate a threshold value.

23. A computer system or process performance method comprising:
collecting, by a tangible computer system, quantitative values of the results or characteristics of a computer system or process, the results or characteristics corresponding to one or more selected from: a database load, a hardware load, a database response time, a computer system response time, a central processor unit utilization, and/or a computer network performance, wherein at least some of the quantitative values are electronically obtained from a device in the computer system or process or obtained by measurement within the computer system or process;
creating, by the computer system, a first metric representing performance of at least an aspect of the computer system or process that is a function of a plurality of different second metrics, each second metric of the plurality of different second metrics and/or indicators representing performance of at least a different type of aspect of the computer system or process, and each second metric of the plurality of different second metrics being a function of a plurality of third metrics, a plurality of indicators, or a combination of one or more third metrics and one or more indicators, each third metric and/or indicator representing performance of at least an aspect of the computer system or process and corresponding to a different result or characteristic of the computer system or process and at least one metric of the metrics being for the same or a lower computer system or process management level than at least one other metric of the metrics;

updating, by the computer system, the first metric based on the quantitative values; and causing an action or change within the computer system or process other than, or in addition to, an alert or report, responsive to a particular performance condition occurring based on the first metric to cause remediation, continuity or recovery of the computer system or process.

24. The method of claim 23, wherein the first metric is based on the quantitative values.

25. The method of claim 23, further comprising a scoring function for each metric configured to normalize a value of the metric in accordance with enterprise-wide performance criteria.

26. The method of claim 23, further comprising evaluating the first metric against a performance goal based upon a higher level performance goal.

27. The method of claim 23, further comprising comparing the first metric to a threshold value.

28. The method of claim 23, further comprising creating a composite metric based on a combination of normalized metrics and/or indicators and weights corresponding to each normalized metric and/or indicator.

29. The method of claim 23, further comprising creating a hierarchically-dependent tree of metrics.

30. The method of claim 23, further comprising managing user access to the quantitative values, a metric, and/or an indicator.

31. The method of claim 23, further comprising creating a custom report based on the first metric.

32. The method of claim 31, further comprising scheduling execution and electronic delivery of the report.

33. The method of claim 23, further comprising displaying the first metric on a user interface.

34. The method of claim 33, wherein the user can drill-down on the user interface through the first metric.

35. The method of claim 33, further comprising accessing enterprise performance information via a mobile device using the user interface.

36. The method of claim 33, further comprising providing to the user a list of performance indicators that indicate failed performance.

37. The method of claim 33, further comprising monitoring a list of events or alerts.

38. The method of claim 23, further comprising determining a value of risk that at least part of the computer system or process has a degradation in performance based on an approximation of a length of time it will take for the first metric to reach a threshold value.

39. The method of claim 23, further comprising determining a value of risk that at least part of the computer system or process has a non-continuity in performance based on a time period value for which the first metric is proximate a threshold value.

40. A computer program product, comprising a non-transitory, tangible medium to implement a computer system or process performance system, the medium having program code embodied therewith, when executed by a computing device, to at least:

collect quantitative values of the results or characteristics of a computer system or process, wherein at least some of the quantitative values are electronically obtained from a device in the computer system or process or obtained by measurement within the computer system or process;

enable a user to create a metric and/or indicator representing at least an aspect of the computer system or process based on the quantitative values;

update the metric and/or indicator based on the quantitative values;

determine a value of risk that at least part of the computer system or process has a degradation in computer system or process operation performance based on an approximation of a length of time it will take for the metric and/or indicator to reach a threshold value, or a value of risk that at least part of the computer system or process has a non-continuity in computer system or process operation performance based on a time period value for which the metric and/or indicator is proximate a threshold value, or both the risk of performance degradation and the risk of performance non-continuity; and cause an action or change within the computer system or process other than, or in addition to, an alert or report, responsive to risk of performance degradation and/or risk of performance non-continuity to cause remediation, continuity or recovery of the computer system or process.

41. A computer system or process performance method comprising:

collecting, by a tangible computer system, quantitative values of the results or characteristics of a computer system or process, wherein at least some of the quantitative values are electronically obtained from a device in the computer system or process or obtained by measurement within the computer system or process;

creating, by the computer system, a metric and/or indicator representing at least an aspect of the computer system or process based on the quantitative values;

updating, by the computer system, the metric and/or indicator based on the quantitative values;

determining, by the computer system, a value of risk that at least part of the computer system or process has a degradation in computer system or process operation performance based on an approximation of a length of time it will take for the metric and/or indicator to reach a threshold value, or comprising determining, by the computer system, a value of risk that at least part of the computer system or process has a non-continuity in computer system or process operation performance based on a time period value for which the metric and/or indicator is proximate a threshold value, or both comprising the determining the risk of performance degradation and the determining the risk of performance non-continuity; and causing an action or change within the computer system or process other than, or in addition to, an alert or report, responsive to risk of performance degradation and/or risk of performance non-continuity to cause remediation, continuity or recovery of the computer system or process.

42. The computer product of claim 15, wherein the user interface comprises an element to display an overall enterprise score, an element to display an overall enterprise risk level, and an element to display one or more individual metrics, indicators or events monitored separately from overall enterprise information.

* * * * *